United States Patent [19]

Ferren et al.

[11] Patent Number: 4,815,694
[45] Date of Patent: Mar. 28, 1989

[54] HIGH SPEED, HIGH VOLUME GAS PULSE GENERATOR

[75] Inventors: Bran Ferren; Phillip Cullum, both of East Hampton; Charles F. Harrison, Wainscott; Kenneth R. Wisner, Southampton, all of N.Y.

[73] Assignee: The Bran Ferren Corporation, Wainscott, N.Y.

[21] Appl. No.: 33,098

[22] Filed: Mar. 31, 1987

[51] Int. Cl.$^4$ ............................................. F16K 31/02
[52] U.S. Cl. ................................... 251/25; 91/35; 92/85 B; 137/624.18; 169/26; 169/61; 251/30.05
[58] Field of Search ............... 91/35; 137/624.18; 169/26, 60, 61; 251/25, 30.02, 30.05; 92/85 B

[56] References Cited

U.S. PATENT DOCUMENTS

| | | | |
|---|---|---|---|
| 2,780,296 | 2/1957 | Heigis | 251/25 |
| 2,819,763 | 1/1958 | Boal | 251/25 |
| 3,170,487 | 2/1965 | Juilfs et al. | 251/25 |
| 3,394,532 | 7/1968 | Oetiker | 137/624.18 |
| 3,710,690 | 1/1973 | Dye | 92/85 B |
| 3,757,497 | 9/1973 | Ray | 137/624.18 |
| 3,949,812 | 4/1976 | Hay | 169/61 |
| 4,082,148 | 4/1978 | Willms | 169/61 |
| 4,210,064 | 7/1980 | Beerens | 92/85 B |
| 4,305,469 | 12/1981 | Morrisette | 169/61 |
| 4,589,627 | 5/1986 | Grotloh | 92/85 B |
| 4,637,473 | 1/1987 | Gillis et al. | 169/61 |

Primary Examiner—George L. Walton
Attorney, Agent, or Firm—Darby & Darby

[57] ABSTRACT

A gas valve for providing a short duration, high volume gas pulse includes an outer chamber having an exhaust gas outlet at its front and an inner chamber which extends along the outer chamber, and terminates, at its forward end, in an opening aligned with the gas outlet of the outer chamber and spaced rearwardly therefrom. Within the inner chamber, a piston is mounted for front-to-rear reciprocal movement, and the length of the piston is selected to be greater than the distance between the valve outlet and inner chamber opening. The piston is provided with an intermediate forwardly-directed, peripheral seat, and the piston's front is dimensioned to close the exhaust gas outlet when the inner chamber is filled with gas at a moderate pressure, which forces the piston forward. The outer chamber can then be filled with a charge of gas at a high pressure. In order to fire the valve, the pressure in the inner chamber is released, whereupon the high pressure acting on the peripheral rim area of the piston urges the piston rearward. When the piston uncovers the valve outlet opening, the full pressure of the outer chamber charge acts on the front of the piston, and the piston is accelerated rapidly rearward, to fully open the exhaust gas outlet. The gas charge of the outer chamber is therefore rapidly discharged. Thereafter, the valve is once more closed by re-pressurizing the inner chamber, and the charge/discharge cycle may be repeated.

20 Claims, 4 Drawing Sheets

HIGH SPEED, HIGH VOLUME GAS PULSE GENERATOR

FIELD OF THE INVENTION

The present invention relates generally to an apparatus capable of generating an extremely short duration high volume pulse of a gas and, more particularly, concerns a gas valve useful in such a generator.

BACKGROUND OF THE INVENTION

In certain applications, such as in firefighting, there is a need to propel large quantities of a fluid or a powdered material over significant distances, with accurate control of placement and position. This can be accomplished by using a short duration gas pulse to propel the extinguishant. It is also desireable to minimize the dispersion of the propelled extinguishant. This can be accomplished by propelling the extinguishant in a highly focussed stream.

The generation of a gas pulse which is effective as a propellant for, for example, firefighting applications requires the release of a relatively large volume of gas during a relatively short duration pulse. Typically, several cubic feet of gas would be released in several hundredths of a second. Of necessity, the generation of such a pulse requires the use of compressed gas at elevated pressures substantially in excess of 100 psi. At such elevated pressures, it has proven difficult, if not impossible, to operate conventional valves rapidly enough to produce the requisite short duration pulses, because it has been necessary to overcome some portion of the high operating pressure, in order to open the valve. Also, the high-operating pressure has a tendency to damage valve components as the valve opens or closes under the influence of the relatively high pressure.

Highly focussed gas generators, called "vortex" generators, are known and have been suggested for providing the necessary propellent force for the extinguishant. Although such vortex generators have been demonstrated on an experimental basis, consistent and reliable operation has not been possible until now. The primary shortcoming has also been the unavailability of an appropriate valve for generating a highly focussed gas vortex.

Broadly, it is an object of the present invention to generate a short duration, high volume gas pulse and to provide an apparatus for doing so.

It is a specific object of the present invention to provide a gas valve capable of rapid opening and closing under high pressure, while also being capable of delivering a relatively high volume of gas during its open intervals.

It is also an object of the present invention to provide a gas valve capable of delivering a low dispersion gas flow.

It is another object of the present invention to provide a generator of a short duration , high volume gas pulse and a pulsed valve for use therein, both of which are reliable, convenient and effective in use, yet relatively inexpensive in construction.

In accordance with an illustrative embodiment demonstrating objects and features of the present invention, there is provided a fire extinguisher including a barrel and a highly-focussed, pulsed gas valve at the rear of the barrel. The barrel is charged with, typically, 20-30 pounds of extinguishant in the form of a liquid or a powder, and this charge is propelled, upon the operation of the gas valve.

In accordance with the present invention, the gas valve includes an outer chamber with an exhaust gas outlet at the front. Inside the outer chamber, there is provided an inner chamber which extends along the outer chamber and terminates, at its forward end, in an opening aligned with the exhaust gas outlet of the outer chamber. The inner chamber opening is spaced rearwardly at a distance from the exhaust gas outlet. Within the inner chamber, a piston is mounted for reciprocal movement between the front and rear of the valve, and the length of the piston is selected to be greater than the distance between the gas outlet and inner chamber opening. Between its front and rear, the piston is provided with a forwardly directed, peripheral seat. The piston is larger than the outer chamber gas outlet. Thus, when the inner chamber is filled with gas at a moderate pressure, the piston is forced forward and closes the valve outlet. The outer chamber can then be filled with a charge of gas at high pressure. In order to fire the valve, the pressure in the inner chamber is released, whereupon the high pressure acting on the peripheral rim area of the piston urges the piston rearward. When the piston uncovers the valve outlet opening, the full pressure of the outer chamber charge acts on the front of the piston, and the piston is accelerated rapidly rearwardly, to fully open the gas outlet. The gas charge of the outer chamber is therefore rapidly discharged. Thereafter, the valve is once more closed by re-pressurizing the inner chamber and the charge/discharge cycle may be repeated.

It is a feature of the present invention that a pulsed gas valve is provided which is capable of generating a highly focussed vortex gas flow.

BRIEF DESCRIPTION OF THE DRAWING

The foregoing brief description, as well as further objects, features and advantages of the present invention will be more completely understood from the following detailed description of presently preferred, but nevertheless illustrative, embodiments in accordance with the present invention, with reference being had to the drawing, in which.

DETAILED DESCRIPTION OF PREFERRED EMBODIMENTS

Figure 1:
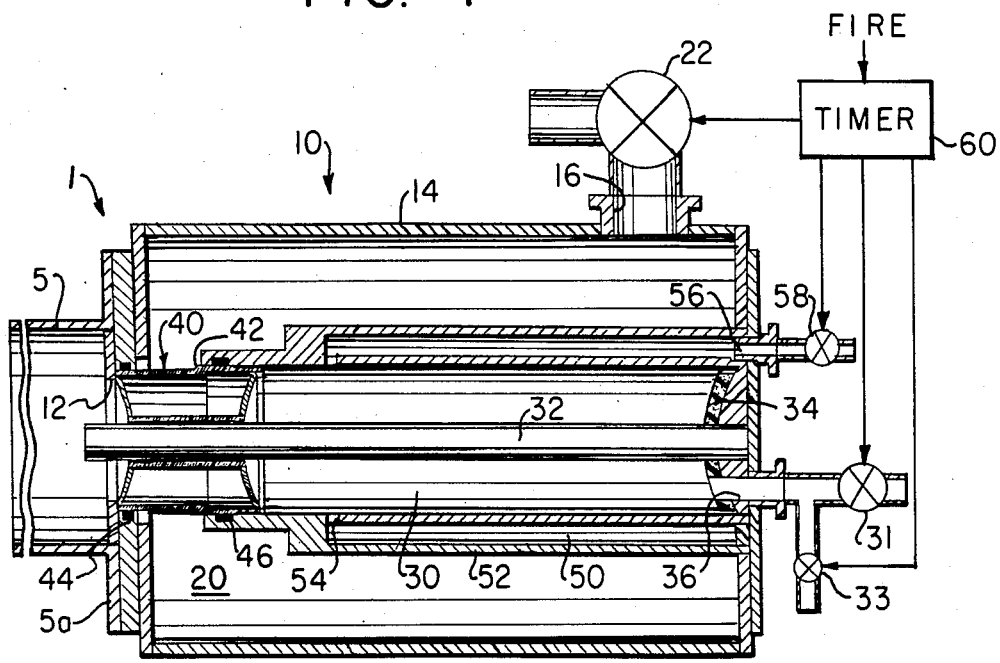
FIG. 1 is a schematic sectional view of a highly-focussed gas generator incorporating objects and features of the present invention, the generator utilizing a first embodiment of a pulsed valve in accordance with the present invention.

Turning now to the details of the drawing, FIG. 1 illustrates a focussed gas generator, useful in firefighting applications, which embodies the present invention. The gas generator 1 includes a barrel 5, which is secured at its rear to a high speed, high volume pulsed gas valve 10, which is capable of producing a vortex flow. This valve is operated in a repetitive pulse mode by means of a number of solenoid-operated, timer-controlled valves. In operation, the barrel is filled with a charge of preferably 20–30 pounds of extinguishant from a source (not shown). Thereafter, vortex valve 10 is fired, whereupon the extinguishant is propelled from barrel 5. Through repetitive charging of barrel 5 followed by firing of valve 10, successive loads of extinguishant can be propelled to a selected location.

Barrel 5 is of a sturdy metal construction which can withstand high-operating pressures and repeated gas pulses. The barrel includes a flange portion 5a, by means of which it may be secured to the front of valve 10 by conventional means, such as bolts (not shown). In the preferred embodiment, barrel 5 has a 10 inch diameter and is 12 inches long. Furthermore, the forward end of the barrel is adapted to receive extensions, whereby the valve may be effectively lengthened. Preferably, the total barrel length is between 1 and 4 feet.

Vortex valve 10 is preferably of a sturdy steel construction. It broadly comprises: an outer chamber 20 in communication with a source of a high pressure gas and having at its front end the valve exhaust opening 12; an elongated inner chamber or cylinder 30 in communication with a source of moderately pressurized gas and having an opened forward end which terminates rearwardly of the valve opening 12; a piston 40 mounted for sliding reciprocal movement within inner chamber 30 and having a forwardly directed peripheral seat 42 between its front and rear ends; and an intermediate chamber 50 preferably surrounding chamber 30 in air flow communication therewith and having an outlet port 56.

In operation (discussed in detail below), inner chamber 30 is filled with pressurized gas, in order to move piston 40 forwardly, to close off the valve opening 12. Thereafter, outer chamber 20 is filled with a charge of high pressure gas, and it retains the gas, because piston 40 effectively seals exhaust outlet opening 12. In order to fire vortex valve 10, intermediate chamber 50 is vented through its outlet port, to permit release of the pressurized gas therein. Inasmuch as chamber 50 is in communication with chamber 30, the pressure within the latter also drops. The high pressure in outer chamber 20, acting on the peripheral seat 42 then urges piston 40 rearwardly. This exposes the front of piston 40 to the full pressure of chamber 20, whereby the piston is rapidly accelerated rearwardly. The gas charge of outer chamber 20 is then rapidly expelled through the fully uncovered exhaust outlet 12. Thereafter, valve 10 can be closed once more by repressurizing inner chamber 30, and the charge/discharge cycle may be repeated.

Outer chamber 20 is formed by the housing 14 of valve 10. Preferably, this housing is of a sturdy steel construction, in order to withstand the relatively high pressures that are present in outer chamber 20. Housing 14 is provided with an inlet port 16, through which outer chamber 20 is coupled to a source of high pressure gas (not shown), preferably coma pressed air, through a solenoid operated valve 22. Those skilled in art will appreciate that the sizes of inlet 16, valve 22, and the tubing connecting inlet 16 with the source of compressed air will have a significant effect on the rate at which outer chamber 20 may be recharged. The port, valve and tubing must therefore be made sufficiently large to permit sufficiently rapid recharging of the valve, to provide the desired firing repetition rate.

In the preferred embodiment, inner chamber 30 has a diameter of 6.5 inches and extends for about 90% of the distance of outer chamber 20, terminating in an opened forward end which is aligned with the valve opening 12. The surfaces of chamber 30 and piston 40 are finely honed and nickel-plated to provide for continued smooth operation of the piston. In chamber 30, and concentric therewith, there is also provided a guide tube 32 for the piston 40. In the rear of inner chamber 30, there is an elastomeric bumper 34 for piston 40 and at least one inlet port 36 is coupled to a source of moderate pressure gas (not shown), preferably compressed air, through a solenoid operated valve 31. Also connected to outlet 36 is a pressure relief valve 33, which is solenoid resettable.

The rear portion of piston 40 is dimensioned for a sliding fit within chamber 30. The forward portion is of a reduced diameter, 6 inches in the preferred embodiment, with the forwardly directed seat 42 being formed at the transition between the forward and rear portions of the piston. The piston develops an effective pressure seal through the provision of a first sealing ring 44 in the forward wall of outer chamber 20 and a second sealing ring 46 at the forward end in the inner surface of inner chamber 30.

Intermediate chamber 50 is formed by a sleeve member 52 which is nearly coextensive with cylinder 30. In the preferred embodiment, sleeve member 52 has an outside diameter of 10 inches. At the forward end of intermediate chamber 50, there are provided a plurality of ports 54 providing air flow communication between inner chamber 30 and intermediate chamber 50. In the preferred embodiment, 16 ports are provided. At the rear of intermediate chamber 50, there is provided an outlet port 56, which is coupled to the exterior of valve 10 through a solenoid operated valve 58.

The operation of valves 22, 31, 33 and 58 is controlled by means of a timer 60, which may be any conventional electromechanical or electronic timer configured to provide the timing signals required to operate vortex valve 10. The specific timing requirements will become apparent from the detailed description of operation of valve 10 which follows. It will be appreciated that the timer will permit repetitive firing of the valve.

FIGS. 2-6 illustrate the five phases of operation of vortex valve 10 during a single firing cycle. In the ensuing description, any valve which is indicated schematically with a "x" symbol will be understood to be closed, whereas a valve shown without such a symbol will be understood to be open.

Figure 2:
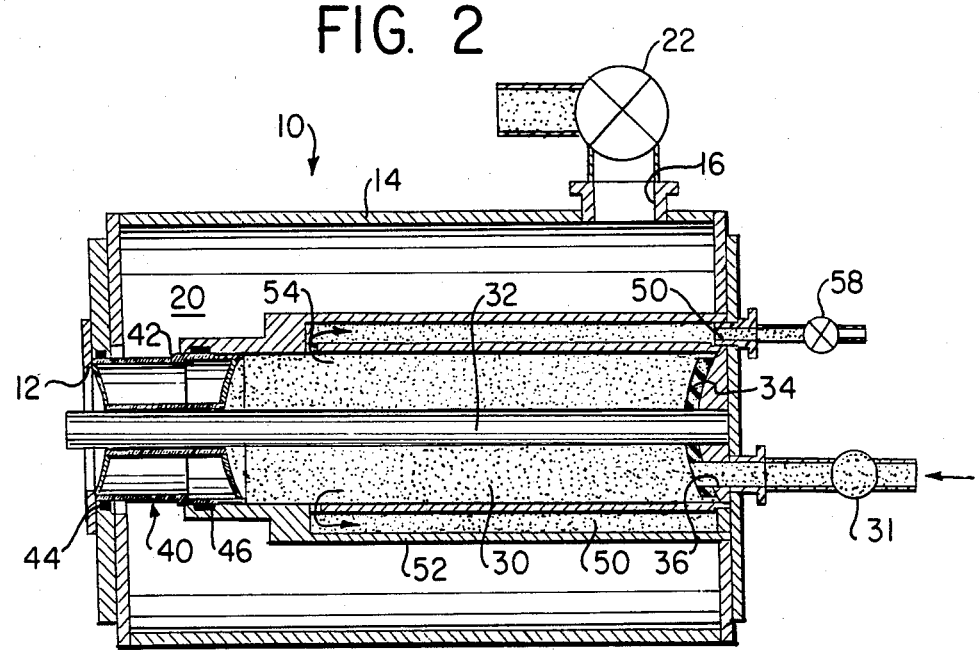
FIGS. 2–6 are sectional views, similar to FIG. 1, illustrating successive steps in the operation of the pulsed gas valve of FIG. 1.

FIG. 2 depicts the end of the first phase of operation. This phase begins after valve 10 has been fired and substantially all of the charge within outer chamber 20 has been expelled through outlet 12. At the beginning of this phase of operation, piston 40 will typically be located towards the rear of cylinder 30, valve 31 is opened and all of the other valves are closed (valve 33 is not shown). With valve 31 open, chamber 30 is coupled to the moderate pressured gas source, and gas begins to fill the chamber behind piston 40. As a result, piston 40 is urged forward and begins moving toward outlet opening 12. When the rear of piston 40 clears the port 54, pressurized gas begins to fill intermediate chamber 50, as well. Timer 60 retains valve 31 open for a sufficient time to firmly seat piston 40 in its forward most position closing off valve opening 12, and valve 31 is then closed. As illustrated by the stippling in FIG. 2, chambers 30 and 50 are then at their full nominal pressures. In the preferred embodiment, these chambers are filled with compressed air at a pressure of approximately 60 psi.

Figure 3:
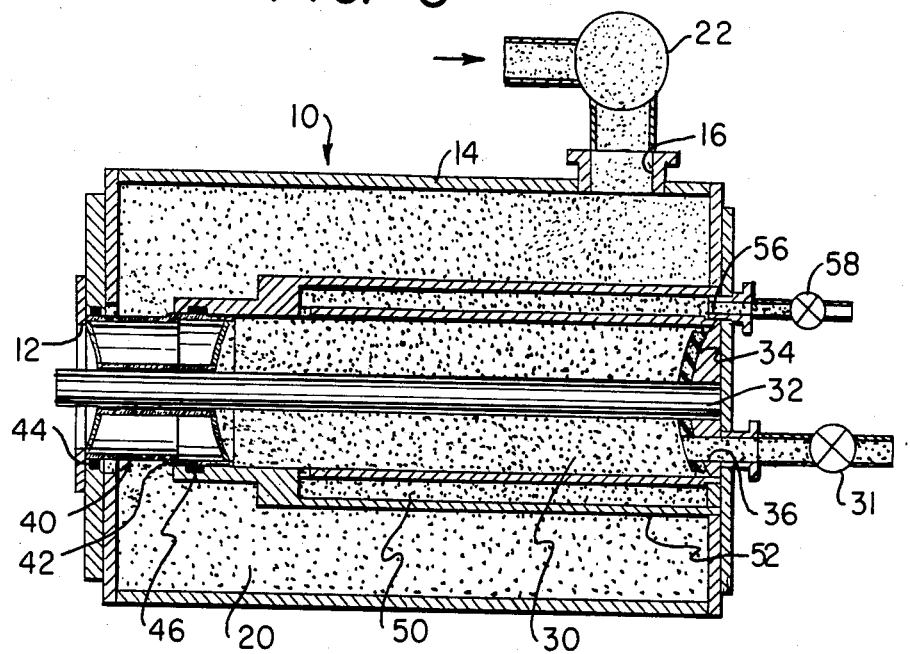

The second phase of operation is illustrated in FIG. 3. After closing valve 31, timer 60 opens valve 22. Outer chamber 20 is then placed in communication with the high pressure gas source, whereupon the high pressure gas begins to fill outer chamber 20. During the filling of chamber 20, piston 40 provides an effective seal between the outer chamber and its valve outlet 12, as well as between the outer chamber and chamber 30. Timer 60 keeps valve 22 open for a sufficient time to bring outer chamber 20 to full nominal pressure, corresponding to a full charge. In the preferred embodiment, outer chamber 20 is filled to a nominal pressure of approximately 100 psi. At the conclusion of the second phase of operation, valve 22 is closed and vortex valve 10 is ready to be fired.

Although FIG. 1 illustrates that an external firing signal is applied to timer 60, typically by the operator pressing a firing button, or the like, it will be appreciated that firing may also be automatic and on a time basis.

Figure 4:
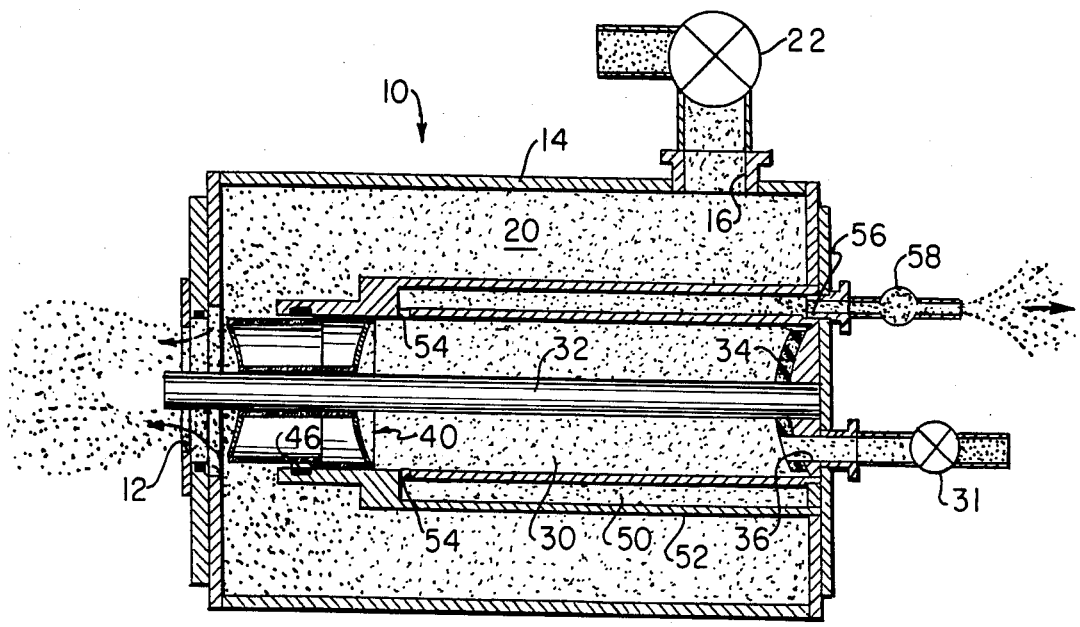

Firing is initiated by opening valve 58, whereupon the third phase of operation, illustrated in FIG. 4, ensues. With valve 58 open, intermediate chamber 50 is vented to the atmosphere, and its pressure begins to drop. Furthermore, since cylinder 30 is coupled to intermediate chamber 50 through ports 54, the pressure in cylinder 30 also drops. Eventually, the pressure in cylinder 30 drops to the point where the pressure in chamber 20, acting on the seat 42, is sufficient to urge piston 40 rearwardly, uncovering valve outlet 12. Through a relatively small amount of movement of piston 40, the front of the piston is exposed to the full pressure of outer chamber 20, and piston 40 is rapidly accelerated rearwardly. It will be appreciated that timer 60, therefore, needs to open valve 58 for only a relatively short period of time sufficient to permit a burst of gas to be emitted through the valve.

Figure 5:
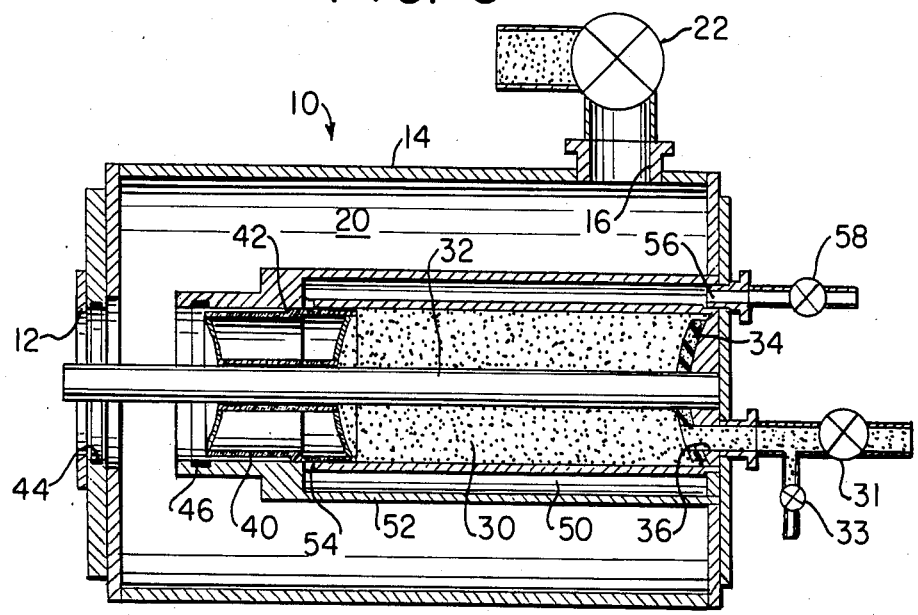

During the fourth phase of operation, depicted in FIG. 5, all valves are closed, valve outlet 12 is fully open, and piston 40 is accelerating rapidly rearwardly. During this phase of operation, the high pressure charge in outer chamber 20 is rapidly ejected. As depicted in FIG. 5, during this phase of operation the rear of piston 40 has passed rearwardly of the ports 54, so that cylinder 30 and intermediate chamber 50 are isolated from each other. At the same time, the rearward movement of piston 40 causes the trapped gas in cylinder 30 to be compressed, whereupon this gas acts as a pneumatic spring, absorbing Kinetic energy from piston 40 and causing the piston to decelerate, thus avoiding any damaging impact of the piston with the rear of the cylinder.

Figure 6:
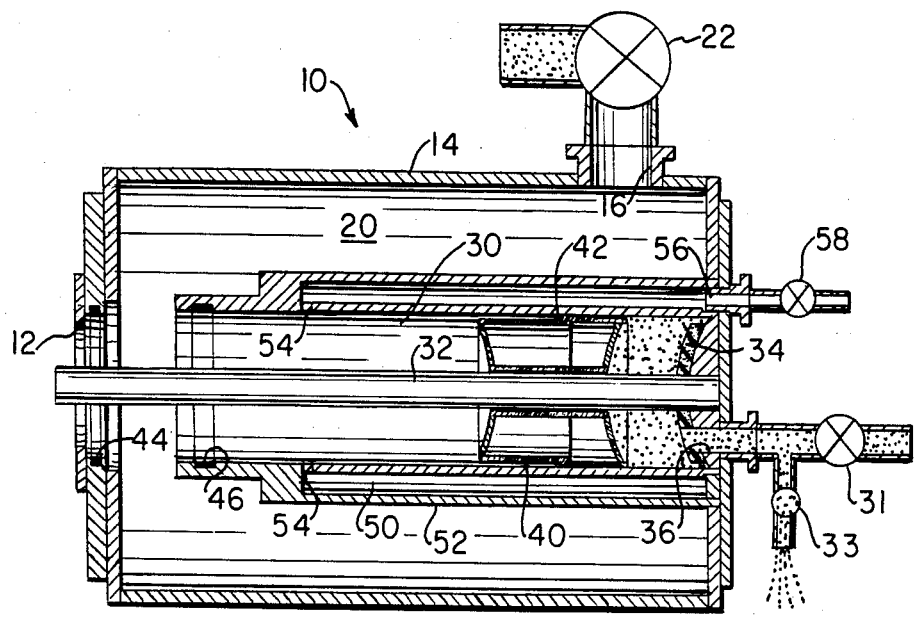

Eventually, the pressure in cylinder 30 reaches a point at which pressure release valve 33 opens and the last phase of operation, depicted in FIG. 6, ensues. Were the pressure behind piston 40 not released, the piston would eventually come to a stop and, owing to the buildup of pressure behind it and the reduction of pressure in front of it, would be hurled forward and could experience a damaging collision with the front of outer chamber 20. The opening of valve 33 permits the release of pressure behind piston 40, avoiding such a calamity. However, valve 33 is preferably designed to have a restricted flow so that some gas continues to be trapped by the piston and continues to decelerate it. Eventually, piston 40 comes to rest at a position close to the rear of chamber 30, as depicted in FIG. 6, or it impacts lightly against the recoil buffer 34, rebounds, and begins moving forward at a slow rate. At this point, timer 60 closes valve 33 and begins phase 1 of the next cycle of operation.

Figure 7:
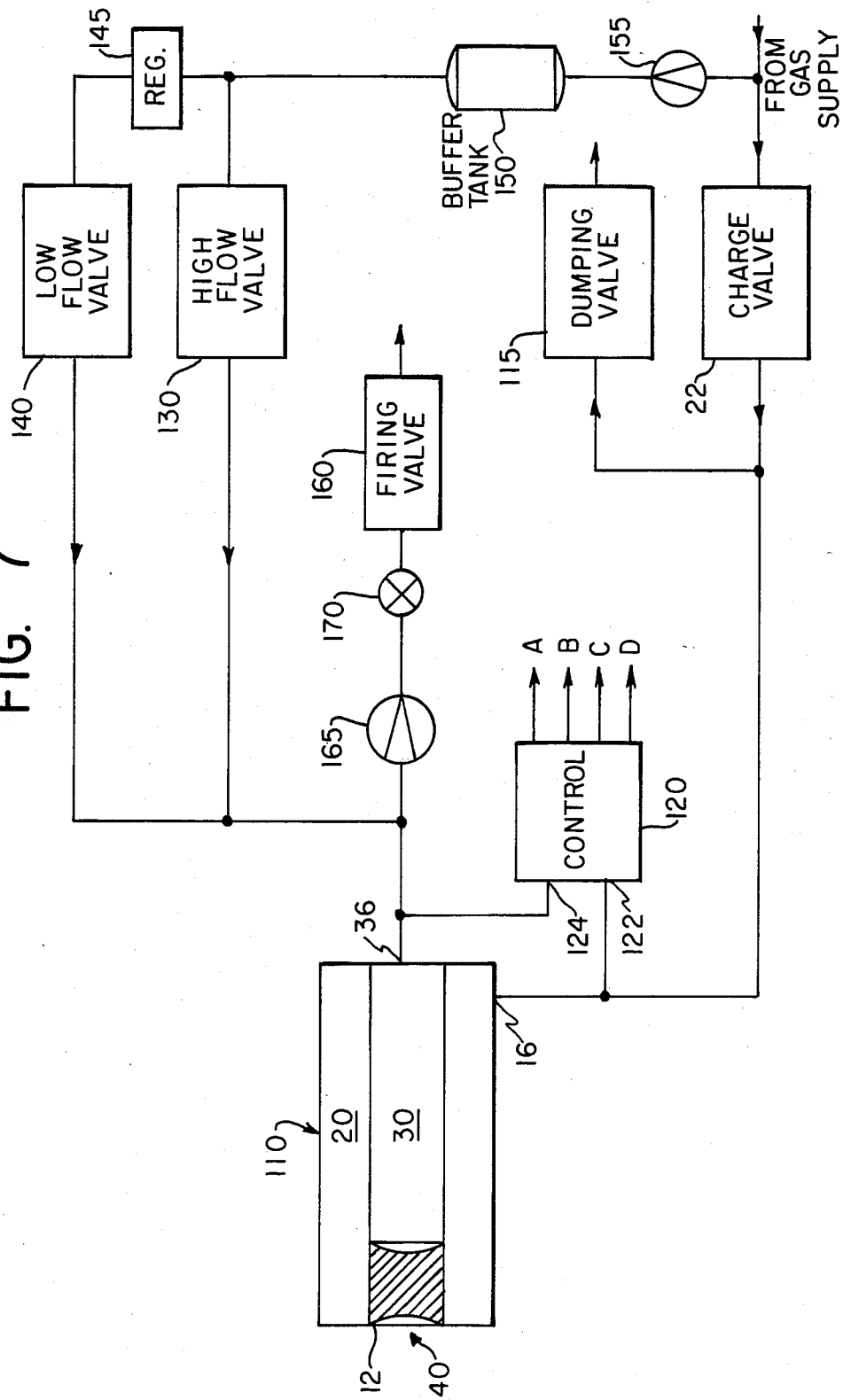
FIG. 7 is a schematic block diagram illustrating an operating system utilizing a second embodiment of a gas valve in accordance with the present invention.

FIG. 7 is a schematic blocked diagram illustrating a second embodiment 110 of vortex valve 10 and a pneumatic operating system therefor. Vortex valve 110 is substantially identical to vortex valve 10, except that intermediate chamber 50 and its ports 54 and 56 are eliminated. In FIG. 7, the corresponding components of vortex valve 110 are identified with the same reference characters as the components of vortex valve 10. Valve 110 is therefore shown only diagrammatically, with the understanding that its construction is essentially the same as that of valve 10. As was the case in FIG. 1, outer chamber 20 is coupled to a high pressured gas supply through a solenoid operated charging valve 22. Also coupled to inlet 16 is an operator-controlled dumping valve 115 and a first pneumatic input 122 of a controller 120.

Inlet 36 of inner chamber 30 is coupled to the gas supply through the shunt connection of a high flow valve 130 with a low flow valve 140 and a pressure regulated 145, a buffer tank 150 and a check valve 155. Inlet 36 is also connected to a firing valve 160 through a check valve 165 and flow restrictor 170. In addition, a second pneumatic input 124 of controller 120 is also connected to inlet 36.

Controller 120 senses the pressures at inlets 16 and 36 via its pneumatic inputs 122 and 124, respectively, and produces output signals A, B, C and D which control the solenoid operators of low flow valve 140, high flow valve 130, firing valve 160 and charging valve 22, respectively. Controller 120 is a conventional type of device, the specific requirements of which will become apparent from the description which follows.

Operation of vortex valve 110 is similar to operation of valve 10. In particular, the valve is fired, after outer chamber 20 has been charged to full pressure, by causing firing valve 160 to open. This can be accomplished by the operator through the operation of a pushbutton, or the like. Alternatively, it is possible to have firing occur automatically by having controller 120 produce a signal C to fire valve 160, when it senses via inlet 122 that outer chamber 20 has achieved full pressure. In either event, the withdrawal of gas from cylinder 30 results in a reduction in the pressure behind piston 40, and the piston is urged rearward under the influence of the full pressure of outer chamber 20 as applied to the seat 42 on piston 40. The piston then uncovers valve outlet 12 and, when the front of the piston is exposed to the full pressure of outer chamber 20, the piston is rapidly accelerated rearward. At the same time outer chamber 20 is rapidly discharged through the exhaust outlet 12.

As piston 40 speeds rearward, gas from cylinder 30 is squeezed out through a restrictor valve 170. However, since the flow through valve 170 is restricted, the pressure behind piston 40 builds up. This causes piston 40 to decelerate and, eventually, to be urged forwardly. As a result of the forward movement of piston 40 and the accompanying expansion in the volume behind piston 40, the pressure at inlet 36 eventually drops below atmospheric pressure, but check valve 165 prevents ambient air from being drawn into cylinder 30. Accordingly, the pressure behind piston 40 continues to drop, and the resulting vacuum behind the piston brings it to a stop before it reaches the front of the valve. At the same time, controller 120 senses the negative pressure at inlet 36 via its inlet 124 and causes signal C to close firing valve 160.

Upon sensing the negative pressure at inlet 36, controller 120 also begins the pressurization of cylinder 30 so as to seat piston 40, thereby closing off valve outlet 12. This pressurization is performed with gas provided from the gas supply through a check valve 155 and a buffer tank 150, which permit operating with a pressure that is substantially lower than the full pressure of the gas supply. For example, in the preferred embodiment, the gas supply is compressed air at a pressure of 100-150 psi, whereas the operating pressure for charging cylinder 30 is preferably maintained at or below 60 psi. Valve 140 is fed from tank 150 through a pressure regulator 145 (set to approximately 50-60 psi), which assures that this valve will provide only a relatively low flow rate when open. On the other hand, high flow valve 130 is connected directly to the tank and will provide a maximum flow rate when open.

Pressurization of chamber 30 is performed in a two-stage charging process. During the first stage of the charging process, controller 120 causes signal A to open low flow valve 140, whereby piston 40 is brought forward to seal outlet 12 without experiencing an excessively rapid increase in pressure, which could produce rapid acceleration of the piston and a potentially damaging impact with the front of chamber 20. Once piston 40 seats against exhaust opening 20 and stops moving forward, the pressure within cylinder 30 begins to build up. This pressure build-up is sensed by controller 120 via inlet 124, and the controller causes signals A and B to open valve 130 and close valve 140, respectively. The resulting high flow rate into cylinder 30 causes the cylinder to be pressurized rapidly to the minimum "cocking" pressure for piston 40 (about 40 psi in the preferred embodiment). When controller 120 senses this minimum cocking pressure, it causes signals A and B to close valve 130 and open valve 140, respectively, so that cylinder 30 is then gently to and maintained at the full pressure set by regulator 145.

In addition, when controller 120 senses that cylinder 30 has reached the minimum cocking pressure, it causes signal D to open charging valve 22, whereby charging of outer chamber 20 begins. When controller 120 senses, via inlet 122, that outer chamber 20 has achieved full pressure, charging valve 22 is close, and vortex valve 110 is ready to be fired. After firing, the cycle of operation just described is repeated for further firings.

Dumping valve 115 is a solenoid operating valve which is actuated by the operator through the use of a pushbutton, or the like. This permits outer chamber 20 to be emptied without actually firing vortex valve 110. For some applications, it would also be desirable to have controller 120 operate dumping valve 115, for example when a dangerously high over pressure condition is sensed in one the chambers 20 or 30.

Both preferred embodiments of the focussed gas generator achieve exceptionally fast operation of the vortex valve. For example, with the given dimensions for the outer chamber 20, the chamber has a volume of about 2.5 cubic feet. The vortex valve operates so rapidly, that 2.5 cubic feet of compressed air can be discharged in 10-20 milliseconds. Furthermore, an entire charge/discharge cycle can be accomplished in approximately one second. The resulting vortex produced by the valve easily propels a 20-30 pound charge of extinguishant over the typical distances encountered in firefighting operations.

Although preferred embodiments of the invention have been disclosed for illustrative purposes, those skilled in the art will appreciate that many additions, modifications and substitutions are possible without departing from the scope and spirit of the invention as defined by the accompanying claims.

What is claimed is:

1. A valve for generating a pulses fluid stream comprising:
   an elongated outer chamber having an exhaust outlet at its front;
   an elongated inner chamber disposed within said outer chamber so as to extend lengthwise along the length thereof, said inner chamber having an inlet for pressurized fluid and also having an open forward end aligned with said exhaust outlet and spaced rearwardly therefrom;
   a piston member mounted within said inner chamber for sliding, reciprocal movement along the length thereof, said piston having a length which is greater than the distance between said exhaust outlet and said inner chamber front end said piston length being substantially less than the length of said inner chamber, said piston having a forward portion dimensioned to cover said exhaust opening and a forwardly directed, peripheral seat disposed rearwardly of said forward portion for permitting initial retraction upon removal of some of the pressurized fluid from said inner chamber, said piston retracting rapidly from the area between said exhaust outlet and the forward end of said inner chamber after said initial retraction, said piston subsequently decelerating as a result of the compression of remaining fluid trapped therebehind.

2. A valve in accordance with claim 1 wherein at least said inner chamber and said piston are cylindrical.

3. A valve in accordance with claim 1 further comprising fluid flow control means connected to said inner chamber inlet and including means adapted to be connected to a source of moderate pressure fluid.

4. A valve in accordance with claim 1 further comprising fluid flow control means connected to said inner chamber inlet for permitting the flow of fluid out of said inner chamber.

5. A valve in accordance with claim 4 wherein said means for permitting the flow of fluid out of said inner chamber includes fluid flow restriction means.

6. A valve in accordance with claim 5 wherein said means for permitting the flow of fluid of said inner chamber includes one-way valve means.

7. A valve in accordance with claim 6 wherein said means for permitting the flow of fluid out of said inner chamber includes one-way valve means.

8. In combination with a valve in accordance with claim 1, a hollow, elongated member secured to the front of said valve so as to project forwardly thereof to define a barrel therefore and means for filling said barrel with a material to be propelled.

9. A method for operating a valve to generate a pulsed high speed, high volume pulsed fluid flow, said valve being of the type comprising an outer chamber having an exhaust outlet at its front; an elongated inner chamber disposed within said outer chamber so as to extend therealong, said inner chamber having a fluid inlet and also having an open forward end aligned with said exhaust outlet and spaced rearwardly therefrom; and a piston member mounted within said inner chamber for sliding, reciprocal movement therealong; said method comprising the steps of:

injecting a fluid from said fluid inlet under moderate pressure into said inner chamber behind said piston so as to urge said piston into sealing engagement with said exhaust outlet;

injecting a fluid under high pressure into said outer chamber until a predefined charging pressure is reached; and enabling a substantially restricted outflow of some of the fluid from said inner chamber to accelerate said piston rapidly rearward, producing a rapid discharge of fluid from said outer chamber through said exhaust outlet, said acceleration being a result of said rapid discharge, said piston being subsequently decelerated in its rearward travel as a result of pressure build-up fluid remaining therebehind.

10. The method of claim 9 further comprising the step of, during the rearward travel of said piston and immediately thereafter, preventing the flow of fluid through said inner chamber inlet into said chamber, whereby said piston moves rearwardly and rebounds in a forward direction, but terminates its forward movement prior to reaching said exhaust outlet.

11. A valve for generating a pulsed fluid stream comprising:

an outer chamber having an exhaust outlet at its front;

an elongated inner chamber disposed within said outer chamber so as to extend therealong, said inner chamber having a gas inlet and also having an open forward end aligned with said exhaust outlet and spaced rearwardly therefrom;

means defining an intermediate chamber surrounding said inner chamber and at least one communication port providing fluid flow communication between said inner and intermediate chambers;

an outlet port from said intermediate chamber to the exterior of said valve; and a piston member mounted within said inner chamber for sliding, reciprocal movement therealong, said piston having a length which is greater than the distance between said exhaust outlet and said inner chamber front end, said piston having a forward portion dimensioned to cover said exhaust opening and a forwardly directed, peripheral seat disposed rearwardly of said forward portion for permitting initial retraction of said piston upon removal of some fluid from said inner chamber through said intermediate chamber, said piston retracting rapidly from the area between said exhaust outlet and the forward end of said inner chamber after said initial retraction, said piston subsequently decelerating as a result of the compression of remaining fluid trapped therebehind after said piston passes rearwardly of said at least one communication port.

12. A valve in accordance with claim 11 further comprising fluid flow control means coupled to said outer chamber inlet and including means adapted to be connected to a source of high pressure fluid.

13. A valve in accordance with claim 11 further comprising fluid flow control means connected to said inner chamber inlet and including means adapted to be connected to a source of moderate pressure fluid.

14. A valve in accordance with claim 11 further comprising fluid flow control means coupled to said outer chamber inlet and including means adapted to be connected to a source of high pressure fluid.

15. A valve in accordance with claim 11 further comprising fluid flow control means connected to said inner chamber inlet for permitting the flow of fluid out of said inner chamber.

16. A valve in accordance with claim 15 wherein said means for permitting the flow of fluid out of said inner chamber includes fluid flow restriction means.

17. A valve in accordance with claim 16 wherein said means for permitting the flow of fluid out of said inner chamber includes one-way valve means.

18. In combination with a valve in accordance with claim 11, a hollow, elongated member secured to the front of said valve so as to project forwardly thereof to define a barrel therefore and means for filling said barrel with a material to be propelled.

19. A method for operating a valve to generate a pulsed high speed, high volume pulsed fluid flow, said valve being of the type comprising an outer chamber having an exhaust outlet at its front; an elongated inner chamber disposed within said outer chamber so as to extend therealong, said inner chamber having a gas inlet and also having an open forward end aligned with said exhaust outlet and spaced rearwardly therefrom; a piston member mounted within said inner chamber for sliding, reciprocal movement therealong; means defining an intermediate chamber surrounding said inner chamber and at least one communication port providing fluid flow communication between said inner and intermediate chambers and; an outlet port from said intermediate chamber to the exterior of said valve; said method comprising the steps of:

injecting a fluid from said fluid inlet under moderate pressure into said inner chamber behind said piston so as to urge said piston into sealing engagement with said exhaust outlet;

injecting a fluid under high pressure into said outer chamber until a predefined charging pressure is reached; and enabling an outflow of fluid from said intermediate chamber to accelerate said piston rapidly rearward, producing a rapid discharge of fluid from said outer chamber through said exhaust outlet, said acceleration being a result of said rapid discharge, said piston being decelerated in its rearward travel as a result of pressure build-up of the remaining fluid therebehind, after said piston passes said at least one communication port.

20. The method of claim 19 further comprising the step of, during the rearward travel of said piston and immediately thereafter, preventing the flow of fluid through said inner chamber inlet into said chamber, whereby said piston moves rearwardly and rebounds in a forward direction, but terminates its forward movement prior to reaching said exhaust outlet.

* * * * *